US012684504B2

(12) United States Patent
Jacobsen et al.

(10) Patent No.: US 12,684,504 B2
(45) Date of Patent: Jul. 14, 2026

(54) SIDELINK COMMUNICATIONS AND AUTOMATIC GAIN CONTROL IN CELLULAR COMMUNICATION NETWORKS

(71) Applicant: Nokia Technologies Oy, Espoo (FI)

(72) Inventors: Thomas Haaning Jacobsen, Nørresundby (DK); Torsten Wildschek, Gloucester (GB); Daniel Medina, Munich (DE); Ling Yu, Kauniainen (FI); Nuno Manuel Kiilerich Pratas, Aalborg (DK); Vinh Van Phan, Oulu (FI); Faranaz Sabouri-Sichani, Aalborg (DK); Jari Olavi Lindholm, Palojoki (FI)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 18/314,011

(22) Filed: May 8, 2023

(65) Prior Publication Data

US 2024/0015671 A1     Jan. 11, 2024

Related U.S. Application Data

(60) Provisional application No. 63/358,364, filed on Jul. 5, 2022.

(51) Int. Cl.
| | |
|---|---|
| *H04W 52/52* | (2009.01) |
| *H04W 72/044* | (2023.01) |
| *H04W 72/40* | (2023.01) |

(52) U.S. Cl.
CPC ......... *H04W 52/52* (2013.01); *H04W 72/044* (2013.01); *H04W 72/40* (2023.01)

(58) Field of Classification Search
CPC . H04W 52/52; H04W 52/146; H04W 52/325; H04W 72/40; H04W 72/44; H04W 92/18; H04L 5/0055
See application file for complete search history.

(56) References Cited

U.S. PATENT DOCUMENTS

| | | | | |
|---|---|---|---|---|
| 12,010,687 B2 * | 6/2024 | Elshafie | | H04W 72/25 |
| 12,108,371 B2 * | 10/2024 | Ryu | | H03G 3/002 |

(Continued)

FOREIGN PATENT DOCUMENTS

WO     2020/231180 A1     11/2020

OTHER PUBLICATIONS

Extended European Search Report received for corresponding European Patent Application No. 23177459.7, dated Nov. 29, 2023, 9 pages.

(Continued)

*Primary Examiner* — Rasheed Gidado
(74) *Attorney, Agent, or Firm* — Barta Jones, PLLC

(57) ABSTRACT

According to an example aspect of the present invention, there is provided an apparatus caused at least to determine a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol and transmit the first automatic gain control symbol during the first symbol of the slot.

12 Claims, 5 Drawing Sheets

510

Determining, by an apparatus, a common AGC symbol to be transmitted during a first symbol of a slot, wherein the first symbol of the slot is for a transmission of a first AGC symbol by a SL Tx UE and for a transmission of a second AGC symbol by a SL Rx UE and the apparatus is the SL Tx UE, wherein the common AGC symbol comprises the first AGC symbol and the second AGC symbol

520

Transmitting, by the apparatus, the first AGC symbol during the first symbol of the slot

(56) References Cited

U.S. PATENT DOCUMENTS

| 12,363,653 | B2 * | 7/2025 | Ryu | H04W 72/0446 |
|---|---|---|---|---|
| 12,439,348 | B2 * | 10/2025 | Ren | H04L 1/08 |
| 2018/0310326 | A1 * | 10/2018 | Tanaka | H04W 72/04 |
| 2022/0086830 | A1 * | 3/2022 | Zhang | H04W 72/0446 |
| 2022/0116934 | A1 * | 4/2022 | Zhang | H04L 5/0055 |
| 2022/0217657 | A1 * | 7/2022 | Hong | H04L 5/00 |
| 2023/0224829 | A1 * | 7/2023 | Ryu | H04W 72/1263 |
| | | | | 455/522 |
| 2023/0262702 | A1 * | 8/2023 | Kutz | H04W 72/0446 |
| | | | | 370/329 |

OTHER PUBLICATIONS

"Synchronization for NR V2X Sidelink Communication", 3GPP TSG RAN WG1 RAN1#96, R1-1902483, Agenda: 7.2.4.1.3, Intel Corporation, Feb. 25-Mar. 1, 2019, 13 pages.

"Deployment band configuration for C-V2X at 5.9 GHz in Europe", 5GAA Automotive Association, Position paper, 2021, pp. 1-11.

"New WID on NR sidelink evolution", 3GPP TSG RAN Meeting #94e, RP-213678, Agenda: 8.6.1, OPPO, Dec. 6-17, 2021, 6 pages.

"3rd Generation Partnership Project; Technical Specification Group Radio Access Network; NR; Physical channels and modulation (Release 17)", 3GPP TS 38.211, V17.1.0, Mar. 2022, pp. 1-135.

"3rd Generation Partnership Project; Technical Specification Group Radio Access Network; V2X Services based on NR; User Equipment (UE) radio transmission and reception; (Release 16)", 3GPP TR 38.886, V16.3.0, Mar. 2021, pp. 1-89.

EP Application No. 22188888.6, "Detecting Transmissions", filed on Aug. 4, 2022, pp. 1-36.

* cited by examiner

| AGC | DMRS | PSSCH | PSSCH | DMRS | PSSCH | PSSCH | DMRS | PSSCH | PSSCH | GUARD | AGC (PSFCH) | PSFCH | GUARD |
|-----|------|-------|-------|------|-------|-------|------|-------|-------|-------|-------------|-------|-------|
| | | PSCCH | | | | | | | | | | | |

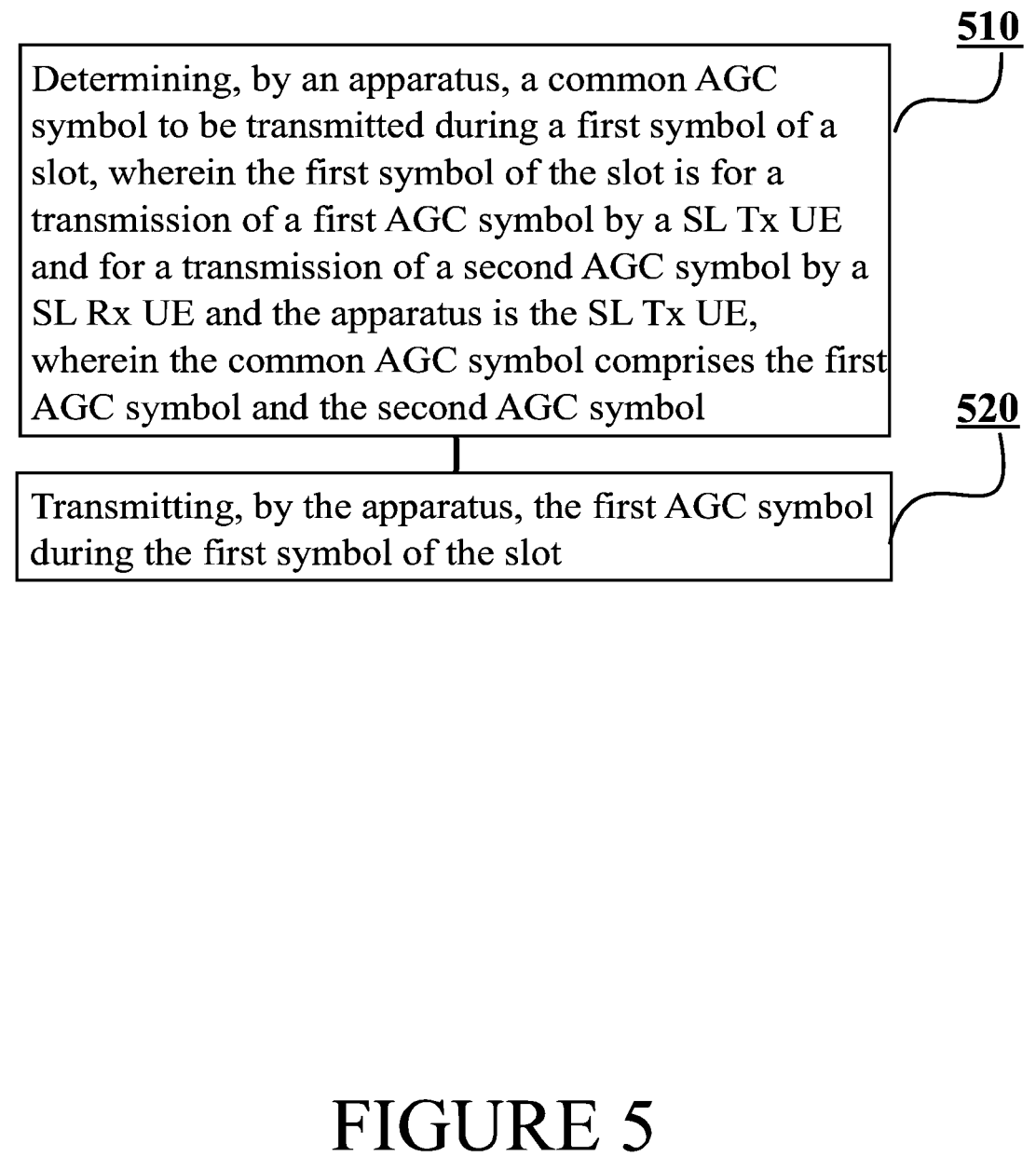

__510__

Determining, by an apparatus, a common AGC symbol to be transmitted during a first symbol of a slot, wherein the first symbol of the slot is for a transmission of a first AGC symbol by a SL Tx UE and for a transmission of a second AGC symbol by a SL Rx UE and the apparatus is the SL Tx UE, wherein the common AGC symbol comprises the first AGC symbol and the second AGC symbol

__520__

Transmitting, by the apparatus, the first AGC symbol during the first symbol of the slot

FIGURE 5

SIDELINK COMMUNICATIONS AND AUTOMATIC GAIN CONTROL IN CELLULAR COMMUNICATION NETWORKS

RELATED APPLICATIONS

This application claims priority from U.S. Provisional Application No. 63/358,364, filed on Jul. 5, 2022, which is hereby incorporated by reference in its entirety.

FIELD

Various example embodiments relate in general to cellular communication networks and more specifically, to sidelink communications and automatic gain control in such networks.

BACKGROUND

Sidelink, SL, is a direct communication link between User Equipment, UEs, in a cellular communication network and UEs can communicate via a SL without going through a Base Station, BS. Communication over the SL may be enabled in various cellular communication networks, such as in cellular communication networks operating according to 5G radio access technology. 5G radio access technology may also be referred to as new radio, NR, access technology. 3rd generation partnership project, 3GPP, develops standards for 5G/NR and some topics in the 3GPP discussions are related to SL communications. According to the discussions there is a need to provide improved methods, apparatuses and computer programs related to the use of SL. Such improvements may be exploited in other cellular communication networks as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus comprising at least one processing core, at least one memory including computer program code, the at least one memory and the computer program code being configured to, with the at least one processing core, cause the apparatus at least to determine a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol and transmit the first automatic gain control symbol during the first symbol of the slot.

Example embodiments of the first aspect may comprise at least one feature from the following bulleted list or any combination of the following features:

- the receiving sidelink user equipment is a user equipment transmitting feedback to the transmitting sidelink user equipment or to another transmitting sidelink user equipment and the transmitting sidelink user equipment is a user equipment transmitting a data transmission to the receiving sidelink user equipment or to another receiving sidelink user;
- the at least one memory and the computer program code are further configured to, with the at least one processing core, cause the apparatus at least to transmit the first automatic gain control symbol with a power that is not smaller than used for subsequent transmissions of the apparatus during the slot;
- the first automatic gain control symbol overlaps with a symbol of a first radio access technology, wherein the symbol of the first radio access technology is used for automatic gain control in time and frequency, and wherein the first automatic gain control symbol is a symbol of a second radio access technology;
- wherein a second symbol, or a part of the second symbol, of the slot is a guard period allowing transitions from reception to transmission and transmission to reception, and the at least one memory and the computer program code are further configured to, with the at least one processing core, cause the apparatus at least to transmit another first automatic gain control symbol during a third symbol of the slot;
- the at least one memory and the computer program code are further configured to, with the at least one processing core, cause the apparatus at least to switch from transmitting to receiving during an eleventh symbol of the slot and receive, from the receiving sidelink user equipment, another second automatic gain control symbol during a twelfth symbol of the slot, adjust automatic gain control of the apparatus according to said another second automatic gain control symbol and receive, from the receiving sidelink user equipment, feedback during a thirteenth symbol of the slot;
- wherein a second symbol, or a part of the second symbol, of the slot is a guard period allowing transitions from reception to transmission and transmission to reception, and the at least one memory and the computer program code are further configured to, with the at least one processing core, cause the apparatus at least to transmit a control signal during a third symbol of the slot;
- wherein the at least one memory and the computer program code are further configured to, with the at least one processing core, cause the apparatus at least to switch from transmitting to receiving during a twelfth symbol of the slot and receive, from the receiving sidelink user equipment, feedback during a thirteenth symbol of the slot;
- wherein a first half, or a part of the first half, of a second symbol of the slot is a guard period allowing transitions from reception to transmission and transmission to reception, and the at least one memory and the computer program code are further configured to, with the at least one processing core, cause the apparatus at least to transmit another first automatic gain control symbol during a second half of the second symbol of the slot;
- wherein the at least one memory and the computer program code are further configured to, with the at least one processing core, cause the apparatus at least to switch from transmitting to receiving during a first half of twelfth symbol of the slot, receive, from the receiving sidelink user equipment, another second automatic gain control symbol during a second half of the twelfth symbol of the slot, adjust automatic gain control of the apparatus according to said another second automatic gain control symbol and receive, from the receiving sidelink user equipment, feedback during a thirteenth symbol of the slot;

the at least one memory and the computer program code are further configured to, with the at least one processing core, cause the apparatus at least to transmit another first automatic gain control symbol during a second symbol of the slot, wherein the first and second symbols are together of equal length in time compared to a first symbol of a first radio access technology, and are symbols of a second radio access technology;

the at least one memory and the computer program code are further configured to, with the at least one processing core, cause the apparatus at least to switch from transmitting to receiving during a twenty-fifth symbol of the slot, receive, from the receiving sidelink user equipment, another second automatic gain control symbol during a twenty-sixth symbol of the slot, adjust automatic gain control of the apparatus according to said another second automatic gain control symbol and receive, from the receiving sidelink user equipment, feedback during a twenty-seventh symbol of the slot;

the transmission of the first automatic gain control symbol is frequency multiplexed with the transmission of the second automatic gain control symbol;

the transmission of the first automatic gain control symbol is transmitted using a Zadoff-Chu or Gold sequence.

According to a second aspect of the present invention, there is provided an apparatus comprising at least one processing core, at least one memory including computer program code, the at least one memory and the computer program code being configured to, with the at least one processing core, cause the apparatus at least to determine a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the receiving sidelink user equipment, wherein the common automatic gain control symbol comprises the first automatic gain control symbol and the second automatic gain control symbol and transmit the second automatic gain control symbol during the first symbol of the slot.

Example embodiments of the second aspect may comprise at least one feature from the following bulleted list or any combination of the following features:

the receiving sidelink user equipment is a user equipment transmitting feedback to the transmitting sidelink user equipment or to another transmitting sidelink user equipment and the transmitting sidelink user equipment is a user equipment transmitting a data transmission to the receiving sidelink user equipment or to another receiving sidelink user;

the at least one memory and the computer program code are further configured to, with the at least one processing core, cause the apparatus at least to transmit the second automatic gain control symbol with a power that is not smaller than used for subsequent transmissions of the apparatus during the slot;

the second automatic gain control symbol overlaps with a symbol of a first radio access technology used for automatic gain control in time and frequency, and is a symbol of a second radio access technology;

wherein a second symbol, or a part of the second symbol, of the slot is a guard period allowing transitions from reception to transmission and transmission to reception, and the at least one memory and the computer program code are further configured to, with the at least one processing core, cause the apparatus at least to receive, from the transmitting sidelink user equipment, another first automatic gain control symbol during a third symbol of the slot and adjust automatic gain control of the apparatus according to said another first automatic gain control symbol;

the at least one memory and the computer program code are further configured to, with the at least one processing core, cause the apparatus at least to switch from receiving to transmitting during an eleventh symbol of the slot, transmit another second automatic gain control symbol during a twelfth symbol of the slot and transmit, to the transmitting sidelink user equipment, feedback during a thirteenth symbol of the slot;

wherein a second symbol, or a part of the second symbol, of the slot is a guard period allowing transitions from reception to transmission and transmission to reception, and the at least one memory and the computer program code are further configured to, with the at least one processing core, cause the apparatus at least to receive, from the transmitting sidelink user equipment, a control signal during a third symbol of the slot;

wherein the at least one memory and the computer program code are further configured to, with the at least one processing core, cause the apparatus at least to switch from receiving to transmitting during a twelfth symbol of the slot and transmit, to the transmitting sidelink user equipment, feedback during a thirteenth symbol of the slot;

wherein a first half or a part of the first half, of a second symbol of the slot is a guard period allowing transitions from reception to transmission and transmission to reception, and the at least one memory and the computer program code are further configured to, with the at least one processing core, cause the apparatus at least to receive, from the transmitting sidelink user equipment, another first automatic gain control symbol during a second half of the second symbol of the slot and adjust automatic gain control of the apparatus according to said another first automatic gain control symbol;

the at least one memory and the computer program code are further configured to, with the at least one processing core, cause the apparatus at least to switch from receiving to transmitting during a first half of a twelfth symbol of the slot, transmit another second automatic gain control symbol during a second half of the twelfth symbol of the slot and transmit, to the transmitting sidelink user equipment, feedback during a thirteenth symbol of the slot;

wherein the at least one memory and the computer program code are further configured to, with the at least one processing core, cause the apparatus at least to receive, from the transmitting sidelink user equipment, another first automatic gain control symbol during the second symbol of the slot, wherein the first and second symbols are together of equal length in time compared to a first symbol of a first radio access technology and are symbols of a second radio access technology and adjust automatic gain control of the apparatus according to said another first automatic gain control symbol;

wherein the at least one memory and the computer program code are further configured to, with the at least one processing core, cause the apparatus at least to switch from receiving to transmitting during a twenty-fifth symbol of the slot, transmit another second automatic gain control symbol during a twenty-sixth symbol of the slot and transmit, to the transmitting sidelink user equipment, feedback during a twenty-seventh symbol of the slot;

the transmission of the second automatic gain control symbol is frequency multiplexed with the transmission of the first automatic gain control symbol;

the transmission of the second automatic gain control symbol is transmitted using a Zadoff-Chu or Gold sequence.

According to a third aspect of the present invention, there is provided a first method, comprising determining, by an apparatus, a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol and transmitting the first automatic gain control symbol during the first symbol of the slot. The first method may be performed by the transmitting sidelink user equipment, or a control device configured to control the functioning thereof, possibly when installed therein.

According to a fourth aspect of the present invention, there is provided a second method, determining, by an apparatus, a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the receiving sidelink user equipment, wherein the common automatic gain control symbol comprises the first automatic gain control symbol and the second automatic gain control symbol and transmitting the second automatic gain control symbol during the first symbol of the slot. The second method may be performed by the receiving sidelink user equipment, or a control device configured to control the functioning thereof, possibly when installed therein.

According to a fifth aspect of the present invention, there is provided an apparatus, comprising means for determining a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol and means for transmitting the first automatic gain control symbol during the first symbol of the slot.

According to a sixth aspect of the present invention, there is provided an apparatus, comprising means for determining a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the receiving sidelink user equipment, wherein the common automatic gain control symbol comprises the first automatic gain control symbol and the second automatic gain control symbol and means for transmitting the second automatic gain control symbol during the first symbol of the slot.

According to a seventh aspect of the present invention, there is provided a non-transitory computer readable medium having stored thereon a set of computer readable instructions that, when executed by at least one processor, cause an apparatus to at least perform the first or the second method. According to an eighth aspect of the present invention, there is provided a computer program comprising instructions which, when the program is executed by an apparatus, cause the apparatus to carry out the first or the second method.

BRIEF DESCRIPTION OF THE DRAWINGS

FIG. 5 illustrates a flow graph of a first method in accordance with at least some example embodiments.

DETAILED DESCRIPTION

Figures 1A, 1B:
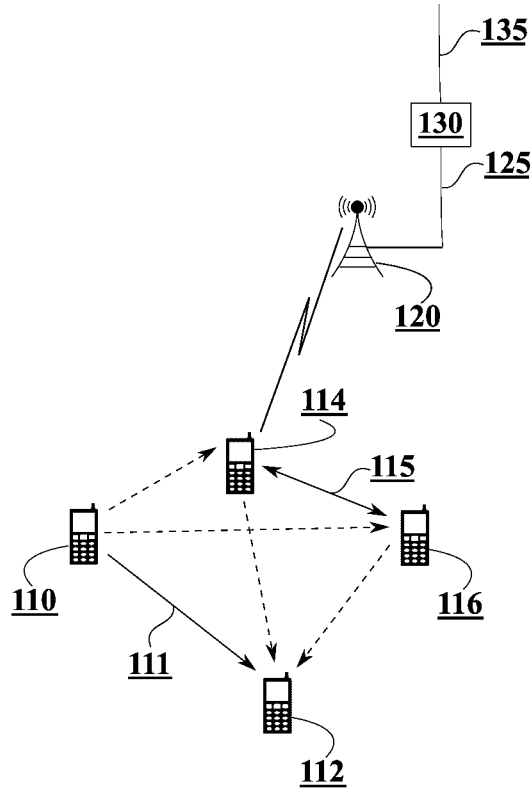
FIG. 1a illustrates an example of a network scenario in accordance with at least some example embodiments.
FIG. 1b illustrates a first example of a slot format in accordance with at least some example embodiments.

Embodiments of the present disclosure provide improvements for sidelink communications in cellular communication networks. More specifically, embodiments of the present disclosure provide improvements related to Automatic Gain Control, AGC, to avoid AGC issues in case of overlapping co-channel Sidelink, SL, transmissions of different Radio Access Technologies, RATs. The AGC issues may be avoided by a SL User Equipment, UE, using a first RAT, by exploiting a common AGC symbol, which is formed by two different AGC symbols, such as a first AGC symbol transmitted by a transmitting SL UE using a second RAT and a second AGC symbol transmitted by a receiving SL UE using the second RAT as well.

FIG. 1 illustrates an example of a network scenario in accordance with at least some example embodiments. According to the example scenario of FIG. 1, there may be a network scenario, comprising four UEs configured to communicate using SL communications. More specifically, the network scenario of FIG. 1 comprises first SL Tx UE 110, first SL Rx UE 112, second SL Tx UE 114 and second SL Rx UE 116. The network scenario of FIG. 1 also comprises Base Station, BS, 120 and core network 130.

SL Tx UEs 110 and 114 may be referred to as transmitting SL UEs, which transmit at least data transmissions. SL Rx UEs 112 and 116 may be referred to as receiving SL UEs, which receive data transmissions and possibly transmit feedback in response to the received data transmissions. In FIG. 1, intended transmission links are denoted by solid lines while interfering links are denoted by dashed lines.

First SL Tx UE 110 and first SL Rx UE 112 may be connected to each other via air interface 111. Similarly, second SL Tx UE 114 and second SL Rx UE 116 may be connected to each other via air interface 115. Transmission of first SL Tx UE 110 may interfere reception of second SL Tx UE 114 and/or second SL Rx UE 116. Similarly, transmission of second SL Tx UE 114 and/or second SL Rx UE 116 may interfere reception of first SL Rx UE 112.

UEs 110, 112, 114 and 116 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. BS 120 may be a network entity that configures some or all control information and allocates at least some resources for UEs. In some example embodiments, BS 120 may be present and considered as a serving node for at least one of UEs 110, 112, 114 and 116.

Air interface 111 between first SL Tx UE 110 and first SL Rx UE 112 may be configured in accordance with the first RAT which UEs 110 and 112 are configured to support. Similarly, air interface 115 between second SL Tx UE 114 and second SL Rx UE 116 may be configured in accordance with the second RAT which second SL Tx UE 114 and second SL Rx UE 116 are configured to support. Examples of cellular RATs include Long Term Evolution, LTE, New Radio, NR, which may also be known as fifth generation, radio access technology, 6G, and MulteFire. A cellular RAT may be standardized by a 3 rd Generation Partnership Project, 3GPP, for example. Hence, UEs 110, 112, 114 and 116, and BS 120 as well, may be configured to operate according to the 3GPP standards. In some embodiments, the first RAT may be LTE and the second RAT may be NR. First SL Tx UE 110 and first SL Rx UE 112 may operate according to the first RAT, e.g. LTE, and second SL Tx UE 114 and second SL Rx UE 116 may operate according to the second RAT, e.g., NR BS 120 may be connected, directly or via at least one intermediate node, with core network 130 via wired interface 125. Core network 130 may be, in turn, coupled via interface 135 with another network (not shown in FIG. 1), via which connectivity to further networks may be obtained, for example via a worldwide interconnection network. BS 120 may be connected, directly or via at least one intermediate node, with core network 130 or with another core network.

Example embodiments are related to using SL based UE-to-UE communication between UEs 110 and 112, and UEs 114 and 116. A SL refers to a direct communication link between UEs in a cellular communication network and the UEs can communicate via the SL without going through BS 120. In some embodiments, UEs 110 112, 114 and 116 may be referred to as a Device-to-Device, D2D, UEs. SL communications may be performed over PC5 for example, as described for example in 3GPP TS 36.400 for LTE and 3GPP TS 38.400 for NR.

In some example embodiments, SL communications may be used on frequency bands 5855-5875 MHz and 5875-5925 MHz, referred to as the 5.9 GHz band, for example by road Intelligent Transport Systems, ITS. Moreover, deployment of Cellular—Vehicle-to-Everything, C-V2x, technologies, such as LTE-V2X and NR-V2X technologies, for direct communications (via a PC5 interface) may take place in the 5.9 GHz band.

Various aspects may need to be considered in case of SL communications. For instance, it may not be allowed to cause harmful interference to an application having priority.

Moreover, road-ITS, and rail-ITS may remain confined to their respective prioritized frequency range until such time when appropriate spectrum sharing solutions are defined. Vehicle-to-Vehicle, V2V, communications for road-ITS may only be permitted, e.g., at 5895-5925 MHz, once spectrum sharing solutions for the protection of rail-ITS have been developed. In the absence of such sharing solutions for the protection of rail-ITS, national administrations may permit Infrastructure-to-Vehicle, I2V, communications for road-ITS at 5915-5925 MHz subject to coordination with rail-ITS. Alternatively, or in addition, use of spectrum in the frequency range of 5855-5875 MHz may be on a non-interference/non-protected basis, and include use by non-safety road-ITS and non-specific short range devices.

Another aspect to consider is the V2X deployment scenario where both LTE V2X and NR V2X UEs may coexist and transmit on the same frequency band. For the two different types of UEs to coexist while using a common carrier frequency, there should be a mechanism to efficiently utilize resource allocation by the two RATs without negatively impacting the operation of each RAT, or at least minimizing the impact on the operation of each RAT. That is, there should be a mechanism to enable co-channel coexistence, e.g., for LTE SL and NR SL UEs.

LTE-V2X may not provide any enhancement to enable the co-existence with NR-V2X, even no change of reconfiguration may be expected to resource pool configurations associated with the LTE-V2X UEs. Instead, enhancements may be designed for NR-V2X UEs, to enable such co-existence. It is noted that such enhancements may be applied for any co-existing cellular RATs as well.

In an example deployment scenario, wherein NR-V2X UEs are able to use the same resources, the NR-V2X numerology needs to be constrained as perfectly as possible within the LTE-V2X numerology. For instance, NR-V2X may be deployed in Frequency Range 1, FR1, with a sub-carrier spacing of 30 kHz, while LTE-V2X may have a sub-carrier spacing of 15 kHz. Therefore, in the time-domain, two NR-V2X slots would be contained in one LTE-V2X subframe (i.e., there would be two NR-V2X slots in the same duration as one LTE-V2X subframe), while in the frequency domain, an NR-V2X Physical Resource Block, PRB, would have twice the bandwidth of an LTE-V2X PRB. Both LTE-V2X and NR-V2X SL resources may be organized into resource pools and organized in the time domain into slots (NR-V2X) or subframes (LTE-V2X), while in the frequency domain such resources would be organized into subchannels composed by a number of PRBs.

For instance, the configurable number of PRBs for LTE-V2X and NR-V2X may be as follows:

LTE-V2X: 4, 5, 6, 8, 9, 10, 12, 15, 16, 18, 20, 25, 30, 48, 50, 72, 75, 96, 100

NR-V2X: 10, 12, 15, 20, 25, 50, 75, 100

So if there would be a perfect overlap between an LTE-V2X resource pool and one (or more) NR-V2X resource pools, there could be the following pairing of configurations, as depicted in Table 1.

TABLE 1

| Example of fully overlapped NR-V2X resource pool into LTE-V2X resource pool | |
| --- | --- |
| LTE-V2X subchannel configuration | NR-V2X subchannel configurations with perfect overlap |
| 20 | 10 |
| 30 | 15 |

9

TABLE 1-continued

Example of fully overlapped NR-V2X resource
pool into LTE-V2X resource pool

| LTE-V2X subchannel configuration | NR-V2X subchannel configurations with perfect overlap |
| --- | --- |
| 48 | 12 |
| 50 | 25 |
| 75 | 25 |
| 100 | 50, 25 |

It is noted that this is just an example but in practice, as there may be multiple LTE-V2X resource pools, it would be possible to achieve any number of LTE-V2X and NR-V2X resource pools. The important aspect is that the LTE-V2X and NR-V2X PRBs may be aligned to overlap both in time and frequency.

In case of LTE SL subframe structure design, the first symbol of each LTE SL subframe may be an AGC symbol, used for example by first SL Rx UE 112, e.g., an LTE SL Rx UE, to adjust an AGC gain of an incoming signal to minimize the quantization noise and prevent saturation at the transceiver Analog-to-Digital Converter, ADC. First SL Rx UE 112 may set the AGC gain based on a carrier wide measurement and analog filtering prior to ADC may be used to filter out-of-band signals while signals within the carrier frequency band may not be filtered. Further, first SL Rx UE 112 may apply this AGC gain for the entire duration of the subframe and expect the power to remain constant within the subframe. First SL Rx UE 112 may adjust and apply the AGC gain similarly.

AGC issues would then occur if first SL Rx UE 112 would experience a change of a power level during the subframe, like an LTE SL subframe. Such a change may be caused by second SL Tx UE 114, such as an NR SL Tx UE, or second SL Tx UE 116, for example in the following situations, when NR SL and LTE SL are frequency domain multiplexed on the same carrier:

1. If the NR SL Tx UE is using a Subcarrier Spacing, SCS, higher than 15 kHz SCS (e.g. 30 kHz SCS corresponding to 0.5 ms slot length), NR SL slots would overlap a fraction of the LTE SL subframe;
2. If the NR SL Rx UE is configured to transmit feedback, for example Hybrid Automatic Repeat reQuest HARQ feedback in Physical Sidelink Feedback Channel, PSFCH, the NR SL Rx UE transmitting said feedback on PSFCH, would initiate its transmission starting where an AGC symbol for feedback is transmitted, such as at symbol 11.

An AGC issue may refer to an issue, wherein the gain is set on a wireless channel before a transmission, but the gain is suddenly not right anymore during the transmission, and a receiving wireless device, such as SL Rx UE 112, would have no chance to adjust the ADC gain. For example, if the energy increases on the wireless channel after setting the gain, the receiving wireless device should adjust the gain lower to avoid saturation, and similarly (but not as severe), if the energy level decreases, the receiving wireless device would need to increase the ADC gain (if it had an AGC symbol). However, if the receiving wireless device cannot adjust the ADC gain due to the change, an AGC issue arises.

Embodiments of the present disclosure therefore enable transmission of feedback by second SL Rx UE 116 without causing an AGC issue to first SL Rx UE 112. More specifically, in some example embodiments, the PSFCH may be used by the NR SL UE without causing an AGC issue to the LTE SL Rx UEs listening in their time overlapped subframe when the NR SL Rx UE transmits on the PSFCH to the NR SL Tx UE.

Embodiments of the present disclosure therefore provide a common AGC, to be used by second SL Tx UE 114 to transmit a first AGC symbol and by second SL Rx UE 116 to transmit a second AGC symbol. In some example embodiments, the common AGC symbol may be for PSFCH, and Physical Sidelink Control Channel, PSCCH, and/or Physical Sidelink Shared Channel, PSSCH, in a first symbol of a slot (in symbol 0, overlapping with an LTE AGC symbol). The common AGC symbol for example enables an NR SL Rx UE to utilize PSFCH without causing an AGC issue to an LTE SL Rx UE operating when NR SL and LTE SL are frequency multiplexed on the same carrier, because the LTE SL Rx UE may set its gain according to the common AGC symbol, i.e., the symbol during which both, the NR SL Rx UE and an NR SL Tx UE transmit. The common AGC symbol may be thus exploited when co-channel co-existence with NR and LTE SL UEs is needed.

Figure 2A:
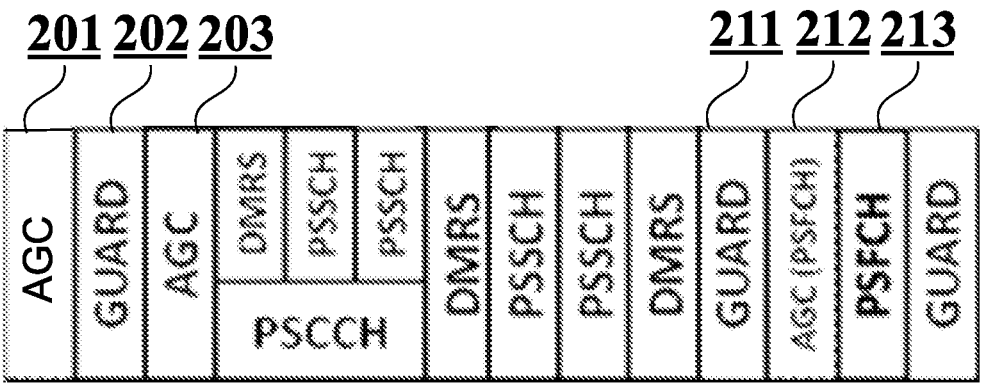
FIG. 2a illustrates a second example of a slot format in accordance with at least some example embodiments.

FIG. 1*b* illustrates a first example of a slot format in accordance with at least some example embodiments. FIG. 2*a* illustrates a second example of a slot format in accordance with at least some example embodiments. In FIG. 2*a*, first symbol 201 (symbol 0) of a slot may be for common AGC symbol transmission of second SL Tx UE 114 and second SL Rx UE 116. That is, second SL Tx UE 114 may determine a common AGC symbol to be transmitted during first symbol 201 and transmit a first AGC symbol during first symbol 201. Second SL Rx UE 116 may also determine a common AGC symbol to be transmitted during first symbol 201 and transmit a second AGC symbol during first symbol 201. In general, a common AGC symbol may be determined to be transmitted based on a configuration, e.g., a configuration may be preconfigured at the factory or received from BS 120. The common AGC symbol may comprise the first and the second AGC symbols. That is, the common AGC symbol may be formed of the first and the second AGC symbols. The first AGC symbol may be transmitted with a highest power that is to be used for subsequent transmissions of second SL Tx UE 114 during the slot while the second AGC symbol may be transmitted with a highest power that is to be used for subsequent transmissions of second SL Rx UE 116 during the slot.

Second symbol 202 (symbol 1) may be a guard period allowing transitions from reception to transmission and transmission to reception. That is, second symbol 202 (symbol 1) may be a guard symbol during which second SL Tx UE 114 may refrain from transmitting and second SL Rx UE 116 may switch from transmitting to receiving. Third symbol 203 (symbol 2) may be for another AGC symbol during which second SL Tx UE 114 may transmit another first AGC symbol and second SL Rx UE 116 may receive said another first AGC symbol accordingly. Second SL Rx UE 116 may then adjust its AGC according to said another first AGC symbol.

Then, for example eleventh symbol 211 (symbol 10) may be a guard symbol during which second SL Tx UE 114 may switch from transmitting to receiving and second SL Rx UE 116 may switch from receiving to transmitting. Twelfth symbol 212 (symbol 11) may be for another AGC symbol during which second SL Rx UE 116 may transmit another second AGC for transmission of a subsequent feedback transmission. Second SL Tx UE 114 may then adjust its AGC according to said another second AGC symbol.

Thirteenth symbol 213 (symbol 12) may be a feedback symbol during which second SL Rx UE 116 may transmit feedback to second SL Tx UE 114. Second SL Rx UE 116 may transmit said feedback in response to data received from second SL Tx UE 114 in an earlier slot (compared to the slot comprising thirteenth symbol 213).

In some example embodiments, second SL Tx UE 114 may be an NR SL Tx UE and it may perform as follows if it wants, or is configured, to use the slot for PSSCH (+Demodulation Reference Signal, DMRS (if configured)) and PSCCH transmission, comprising one or more of the following:

Transmit a first AGC symbol in first symbol 201 (symbol 0), which may be a replica of third symbol 203 (symbol 2) in the example of FIG. 2a, such as a replica of symbol 0 in the first example shown in FIG. 1b;

Refrain from transmitting in second symbol 202 (Symbol 1) as second symbol 202 may be a guard symbol allowing second SL Rx UE 116 to transition from transmission to reception;

Transmit another first AGC symbol during third symbol 203 (symbol 2), wherein said another first AGC symbol may be a replica of symbol 0 in the first example shown in FIG. 1b. Said another first AGC symbol may be transmitted to enable an NR SL Rx UE, like second SL Rx UE 116, to perform AGC based on the expected power for the PSSCH and PSCCH part of the slot, and not only based on the AGC symbol in first symbol 201 (the new symbol 0) which represents the worst case power density in the slot;

Transmit in third to tenth symbols (symbols 2-9) with the same transmit power as used in first symbol 201 (first AGC symbol, symbol 0).

In some example embodiments, second SL Rx UE 116 may be an NR SL Rx UE and it may perform as follows if it wants, or is configured to transmit PSFCH and use the slot also for PSSCH (+DMRS) and PSCCH reception, comprising one or more of the following:

Transmit a second AGC in first symbol 201 (symbol 0), possibly with the maximum transmit power intended to be used for either PSSCH/PSCCG or PSFCH, thereby making it possible for first SL Rx UE 112, like a LTE SL Rx UE, to adjust its AGC by taking into account the first and second AGC symbols, i.e., the transmission of both, the NR SL Tx UE and the NR SL Rx UE. The second AGC symbol transmitted in first symbol 201 may be a replica of third symbol 203 (symbol 2) or twelfth symbol 212 (symbol 11);

receive in third to tenth symbols (symbols 2-9) according to received AGC symbol in symbol 201/302/212.

In some example embodiments, second SL Rx UE 116 may be a NR SL Rx UE and it may perform as follows if it wants, or is configured, to monitor for NR SL (receiving PSCCH and PSSCH from an NR SL Tx UE, such as second SL Tx UE 114):

Receive in third to tenth symbols (symbols 2-9) as shown in FIG. 2a for PSSCH/PSCCH. As said another first AGC symbol may be received in third symbol 203 (symbol 2), the NR SL Rx UE does not need to wake up to listen for first symbol 201 (symbol 0) as well, thereby saving power; Transmit in symbol 11 and 12 for PSFCH.

In some example embodiments, second SL Rx UE 116 may be an NR SL Rx UE and it may perform as follows if it wants to transmit only PSFCH:

Transmit the second AGC symbol in the common AGC in symbol 201 (symbol 0). The second AGC may be a normal PSFCH AGC, like a copy of symbol 213 (symbol 12). The second AGC may be transmitted with the same transmit power as symbol 212 and symbol 213 (symbols 11 and 12), i.e., with a highest power that is to be used for subsequent transmissions of the NR SL Rx UE during the slot;

In some embodiments, the NR SL Rx UE may decide to transmit a replica of symbol 212 (symbol 11) as symbol 201 (symbol 0). In such a case, the NR SL Rx UE may not yet have the result if that includes PSSCH/PSCCH of the same slot. In that case, the NR SL Rx UE may need to make an assumption of the HARQ feedback, for transmission of symbol 201, as the AGC symbol for PSFCH may be a replica of the symbol for PSFCH;

Refrain from transmitting in second symbol 202 (Symbol 1) and switch from transmission to reception during second symbol 202;

Monitor third to tenth symbols (symbols 2-9), if needed;

Switch from receiving to transmitting during eleventh symbol 211 of the slot (symbol 10), transmit another second AGC symbol (PSFCH AGC in symbol 11) during twelfth symbol 212 of the slot and transmit, to the NR SL Tx UE, feedback (PSFCH in symbol 12) during thirteenth symbol 213 of the slot. Said another second AGC may be a replica of the feedback transmitted in during thirteenth symbol 213 (symbol 12).

The second example illustrated in FIG. 2a may be a NR slot format for SL and used when NR is deployed in a co-channel co-existence with LTE SL UEs. The cost of using the slot format illustrated in FIG. 2a would be the additional AGC symbol (symbols 201 and 203 used instead of just one) and two guard symbols (symbols 202 and 211 instead of just one). An alternative may be to drop the NR transmission or reply on complete Time Division Multiplexing, TDM, procedures for co-existence of NR and LTE SL.

Furthermore, in some embodiments, PSFCH may be enabled at every fourth slot so the overhead of the slot format illustrated in FIG. 2a would be 3 symbols at every $4^{th}$ NR slot. The slot format illustrated in FIG. 2a may also be used in non-coexistence situations, at least in the case a common format is desired.

Figure 2B:
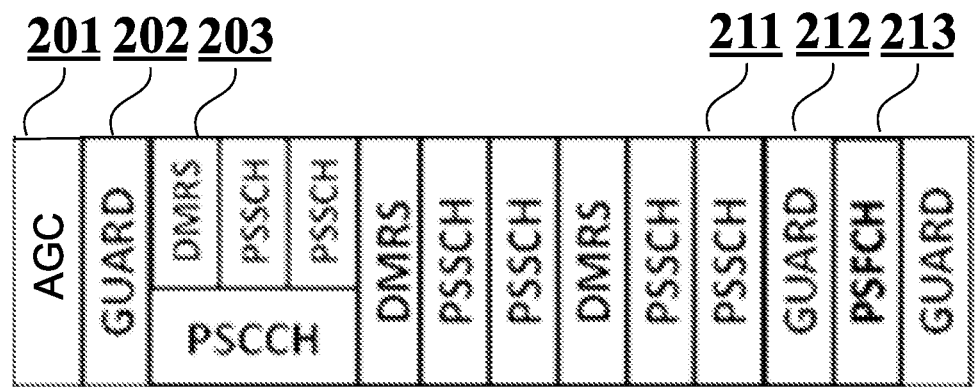
FIG. 2b illustrates a third example of a slot format in accordance with at least some example embodiments.

FIG. 2b illustrates a third example of a slot format in accordance with at least some example embodiments. More specifically, FIG. 2b illustrates a slot format without additional AGC symbols transmitted during third symbol 203 and twelfth symbol 212 as shown in FIG. 2a.

The additional NR AGC symbols transmitted during third symbol 203 and twelfth symbol 212 may be used to minimize the quantization noise of the NR AGC setting when it is to receive either PSFCH or PSCCH/PSSCH, as the first common AGC symbol, i.e., first symbol 201, might not accurately represent the transmit power in the entire slot. The cost would be that it requires 2 additional symbols that cannot be used for anything else than AGC. So if the additional AGC symbols transmitted during third symbol 203 and twelfth symbol 212 would be removed, an NR SL UE receiving PSFCH or PSCCH/PSSCH may use first symbol 201 (symbol 0) for AGC and experience the same small quantization error due to a smaller AGC gain than the UE would normally use which is the same for LTE SL UEs.

In the third example shown in FIG. 2b, second symbol 202 of the slot may be a guard period allowing transitions from reception to transmission and transmission to reception. Then, second SL Tx UE 114 may transmit a control signal, such as a DMRS, during third symbol 203 and second Rx UE 116 may receive the control signal accordingly.

In some embodiments, second SL Tx UE 114 may switch from transmitting to receiving and second Rx UE 116 may switch from receiving to transmitting during twelfth symbol 212 of the slot. After that, second Rx UE 116 may transmit feedback to SL Tx UE 114 during thirteenth symbol 213 of the slot and SL Tx UE 114 may receive said feedback accordingly. Second Rx UE 116 may transmit said feedback in response to data received from second Tx UE 114 in an earlier slot (compared to the slot comprising thirteenth symbol 213).

Figure 3A:
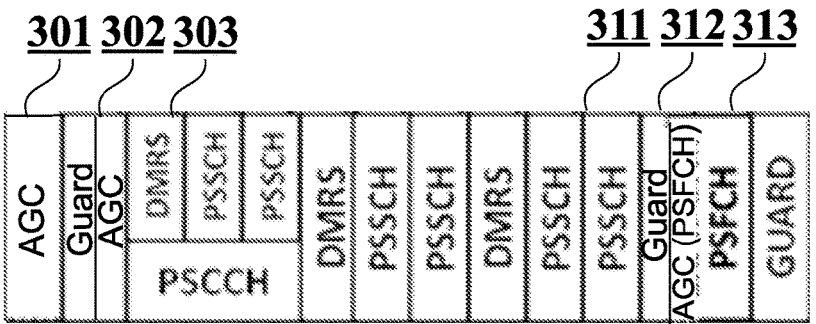
FIG. 3a illustrates a fourth example of a slot format in accordance with at least some example embodiments.

FIG. 3a illustrates a fourth example of a slot format in accordance with at least some example embodiments. More specifically, FIG. 3a illustrates a slot format with combined AGC and guard symbols. The symbol duration of the in-slot guard symbols and in-slot AGC symbols is reduced, hence merging second symbol 202 and third symbol 203 shown in FIG. 2a (symbols 1 and 2) into second symbol 302 shown in FIG. 3a as well as eleventh symbol 211 and twelfth symbol 212 shown in FIG. 2a (symbols 10 and 11) into twelfth symbol 312 shown in FIG. 3a.

In the fourth example shown in FIG. 3a, a first half of second symbol 302 of the slot may be a guard period allowing transitions from reception to transmission and transmission to reception. Then, second SL Tx UE 114 may transmit another first AGC symbol during a second half of second symbol 302 of the slot and second Rx UE 116 may receive said another first AGC symbol accordingly. Second SL Tx UE 114 may also transmit a control signal, such as a DMRS, during third slot 303 and second Rx UE 116 may receive the control signal accordingly.

In some embodiments, second SL Tx UE 114 may switch from transmitting to receiving and second Rx UE 116 may switch from receiving to transmitting during a first half of twelfth symbol 312 of the slot. After that, second Rx UE 116 may transmit another second AGC symbol during a second half of twelfth symbol 312 of the slot and SL Tx UE 114 may receive said another AGC symbol accordingly. Second Rx UE 116 may transmit feedback to SL Tx UE 114 during thirteenth symbol 313 of the slot and SL Tx UE 114 may receive said feedback accordingly. Second Rx UE 116 may transmit said feedback in response to data received from second Tx UE 114 in an earlier slot (compared to the slot comprising thirteenth symbol 313).

Figure 3B:
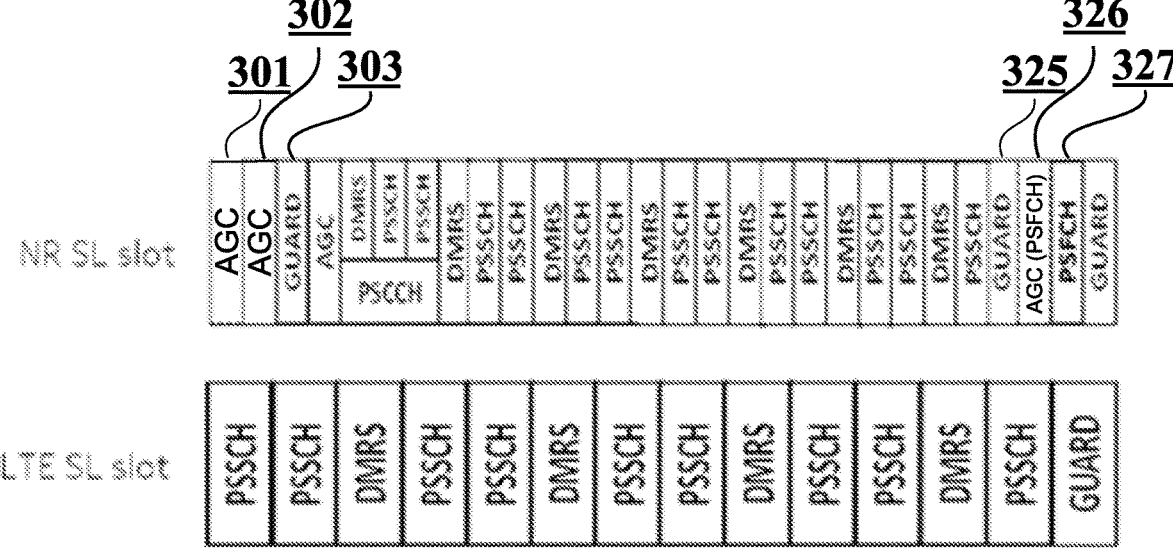
FIG. 3b illustrates a fifth example of a slot format in accordance with at least some example embodiments.

FIG. 3b illustrates a fifth example of a slot format in accordance with at least some example embodiments. More specifically, FIG. 3b illustrates handling of AGC issues when for example an NR SL UE uses a higher SCS than an LTE SL UE.

Second SL Tx UE 114, such as an NR SL UE, may transmit another first AGC symbol during second symbol 302 of the slot, wherein first symbol 301 and second symbol 302 are together of equal length in time compared to a first symbol of a first RAT, such as LTE, and are symbols of a second RAT, such as NR. Second SL Rx UE 116, such as an NR SL Rx UE, may receive said another first AGC symbol during second symbol 302 of the slot accordingly.

In some embodiments, second SL Tx UE 114 may switch from transmitting to receiving and second SL Rx UE 116 may switch from receiving to transmitting during twenty-fifth symbol 325 of the slot. After that, second Rx UE 116 may transmit another second AGC symbol during twenty-sixth symbol 326 of the slot and SL Tx UE 114 may receive said another AGC symbol accordingly. Second Rx UE 116 may transmit feedback to SL Tx UE 114 during twenty-seventh symbol 327 of the slot and SL Tx UE 114 may receive said feedback accordingly. Second Rx UE 116 may transmit said feedback in response to data received from second Tx UE 114 in an earlier slot (compared to the slot comprising twenty-seventh symbol 327).

Common AGC symbol transmitted during first slots 201, 301 may thus not be immediately followed by PSCCH or PSFCH as in the first example shown in FIG. 1b. This means, along with the fact that it may be used when for example an NR UE wants to transmit PSCCH/PSCCH and PSFCH, that the information in it is non-coherent and then not decodable as an NR UE transmitting PSFCH may use a PSFCH AGC in the new AGC symbol, and an NR SL UE that wants to transmit PSCCH/PSSCH may transmit a replica of the AGC symbol of the first example shown in FIG. 1b in the common AGC symbol. A UE that wants to transmit both PSFCH and PSCCH/PSSCH may freely choose. In some embodiments, a common format for the first and second AGC symbols transmitted during first slots 201, 301 may be thus considered such that it can actually be decoded in case of multiple overlapping transmission from NR SL UEs with different usages of the slot.

As a first example, frequency multiplexing may be performed for AGC for PSCCH/PSSCH and AGC for PSFCH in the common AGC symbol transmitted during first slots 201, 301. That is, the transmission of the first AGC symbol may be frequency multiplexed with the transmission of the second AGC symbol. Frequency multiplexing may be done by configuring a set of PRBs for AGC for PSCCH/PSSCH next to the ones used for AGC for PSFCH. For instance, if PSFCH occupies 20 PRBs from PRB #0 to PRB #19, then AGC for PSSCH/PSCCH may occupy X PRBs from PRB #20 till PRB #(20+X). In this case also a UE may transmit with the highest transmit power in the common AGC symbol as it will use in the subsequent transmissions of the slot. In some embodiments, the UE transmitting this new set of PRBs for PSCCH/PSSCH access may take these as a subset of what is transmitted in the first symbol of PSSCH/PSCCH, and in another it could be a small reference signal, e.g., Zadoff-Chu sequence.

As a second example, a common AGC with a reference sequence may replace the traditional AGC behaviour. The UE may still transmit with the highest intended power to be used for subsequent transmissions in the slot. However, it may not be assumed that the information transmitted in the common AGC symbol during first slots 201, 301 is decodable. Instead, the content in the common AGC may be standardized such that it can be used for something useful. In some embodiments, the content may be replaced with a Zadoff-Chu or Gold sequence where the root and/or cyclic offset is decided based on a device identity (e.g. Radio Network Temporary Identifier, RNTI). That is, the first and the second AGC symbols may be transmitted using a Zadoff-Chu or Gold sequence, thereby enabling a receiver to attempt estimating how many are attempting to use this slot, and attempt to estimate which other UEs are trying to use the slot. If only one other device is transmitting, this can be used for channel estimation purposes alike DMRS.

In some example embodiments, N slots may be aggregated and second SL Tx UE 114 may switch from transmitting to receiving during a (N*14−4) symbol of the slot and receive, from SL Rx UE 116, another second automatic gain control symbol during a (N*14−3) symbol of the slot.

Figure 4:
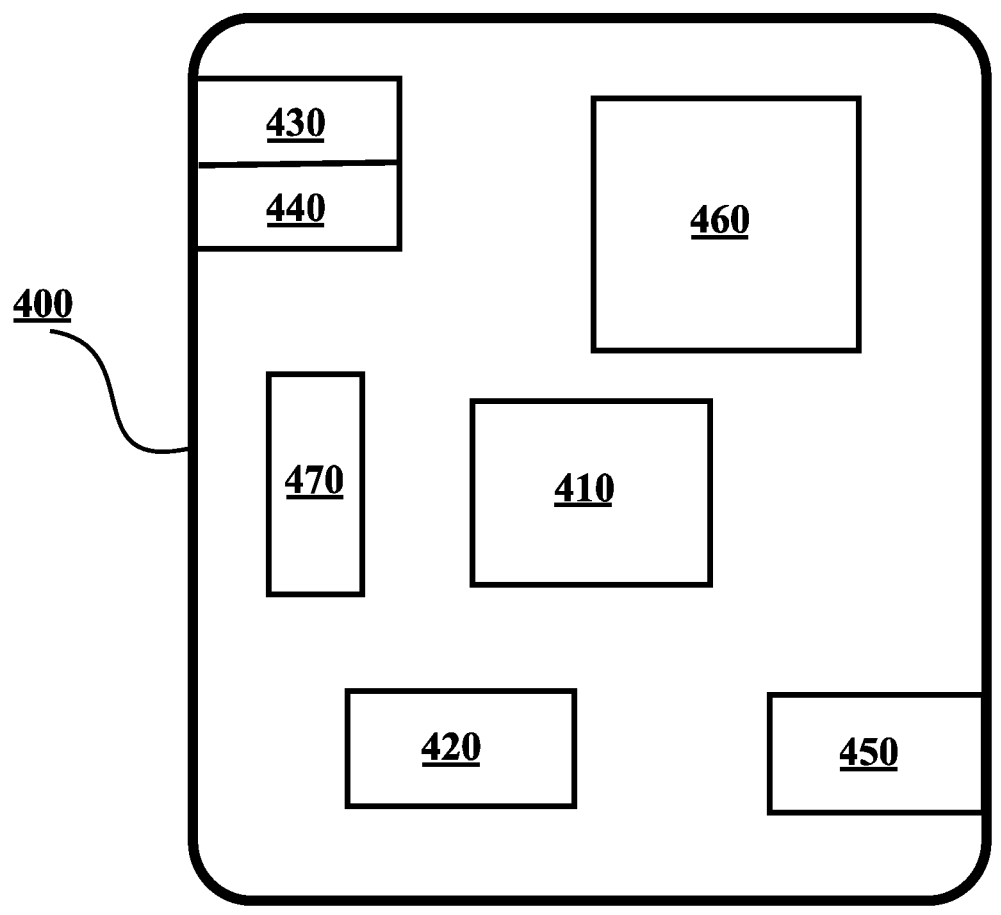
FIG. 4 illustrates an example apparatus capable of supporting at least some example embodiments.

FIG. 4 illustrates an example apparatus capable of supporting at least some example embodiments. Illustrated is device 400, which may comprise, for example, second SL Tx UE 114 or second SL Rx UE 116, or a device controlling functioning thereof, possibly when installed therein. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. Processor 410 may comprise at least one Application-Specific Integrated Circuit, ASIC. Processor 410 may comprise at least one Field-Programmable Gate Array, FPGA. Processor 410 may comprise at least one Qualcomm Snapdragon and/or Intel Atom processor. Processor 410 may comprise, for example, a Cortex-A8 processing core manufactured by ARM Holdings or a Steamroller processing core produced by Advanced Micro Devices Corporation. Processor 410 may be means for performing method steps in device 400, such as determining, causing transmitting and causing receiving. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, Long Term Evolution, LTE, and/or 5G/NR standards, for example.

Device 400 may comprise a Near-Field Communication, NFC, transceiver 450. NFC transceiver 450 may support at least one NFC technology, such as Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the embodiments.

FIG. 5 is a flow graph of a first method in accordance with at least some example embodiments. The phases of the illustrated first method may be performed by second SL Tx UE 114, such as an NR SL Tx UE, or a device controlling functioning thereof, possibly when installed therein.

The first method may comprise, at step 510, determining a common AGC symbol to be transmitted during a first symbol of a slot, wherein the first symbol of the slot is for a transmission of a first AGC symbol by a Tx SL UE and for a transmission of a second AGC symbol by a Rx SL UE and the apparatus is the Tx SL UE, wherein the common AGC symbol comprises the first AGC symbol and the second AGC symbol. The first method also comprises, at step 520, transmitting the first AGC symbol during the first symbol of the slot.

In general, the first symbol may refer to a first period, such as a first symbol, first half-symbol, or first two symbols. The slot may refer to a slot of a second RAT, such as NR.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, comprising for example second SL Tx UE 114 or second SL Rx UE 116, may further comprise means for carrying out the example embodiments described above and any combination thereof. The apparatus may be an apparatus of a cellular communication network, such as a 5G network, and comprise means for operating in the cellular communication network.

In an example embodiment, a computer program comprising instructions which, when the program is executed by a computer, cause the computer to carry out a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, comprising for second SL Tx UE 114 or second SL Rx UE 116, may further comprise at least one processor, and at least one memory including computer program code, wherein the at least one memory and the computer program code are configured to, with the at least one processor, cause the apparatus at least to perform the example embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

Acronyms List

3GPP 3rd Generation Partnership Project
ADC Analog-to-Digital Converter
AGC Automatic Gain Control
BS Base Station
C-V2X Cellular-Vehicle-to-everything
CBR Channel Busy Ratio
D2D Device-to-Device
DMRS Demodulation Reference Signal
FR Frequency Range
GSM Global System for Mobile communication
HARQ Hybrid Automatic Repeat reQuest
I2V Infrastructure-to-Vehicle
IoT Internet of Things
ITS Intelligent Transport Systems
LTE Long-Term Evolution
M2M Machine-to-Machine NFC Near-Field Communication
NR New Radio
PRB Physical Resource Block
PSCCH Physical Sidelink Control Channel
PSFCH Physical Sidelink Feedback Channel
PSSCH Physical Sidelink Shared Channel
RAT Radio Access Technology
RNTI Radio Network Temporary Identifier
SCS Subcarrier Spacing
SL Sidelink
TDM Time Division Multiplexing
UE User Equipment
UI User Interface
V2V Vehicle-to-vehicle
WCDMA Wideband Code Division Multiple Access
WiMAX Worldwide Interoperability for Microwave Access
WLAN Wireless Local Area Network

REFERENCE SIGNS LIST

| 111, 115 | Air interfaces |
|---|---|
| 110 | First SL Tx UE |
| 112 | First SL Rx UE |
| 114 | Second SL Tx UE |
| 116 | Second SL Rx UE |
| 120 | BS |
| 130 | Core network |
| 201-327 | Symbols |
| 400-470 | Structure of the apparatus of FIG. 4 |
| 510-520 | Phases of the method in FIG. 5 |

What is claimed is:

1. An apparatus comprising:
at least one processor; and
at least one memory including computer program code;
the at least one memory and the computer program code configured to, with the at least one processor, cause the apparatus at least to:
determine a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol; and
transmit the first automatic gain control symbol during the first symbol of the slot, wherein:
the first symbol is symbol 0 of a fourteen-symbol New Radio sidelink slot in Frequency Range 1 having a 30 kHz subcarrier spacing;
determining the common automatic gain control symbol comprises determining that the symbol 0 of the slot temporally overlaps, on a same 5.9 GHz carrier frequency, a first symbol of a Long Term Evolution vehicle-to-everything sidelink subframe that is an automatic gain control symbol of a Long Term Evolution sidelink receiving user equipment; and
transmitting the first automatic gain control symbol during the symbol 0 comprises transmitting the first automatic gain control symbol with a highest transmit power that the transmitting sidelink user equipment uses for physical sidelink shared channel and physical sidelink control channel transmissions in symbols between symbol 2 through symbol 9 of the slot;
refrain from transmitting during symbol 1 of the slot, the symbol 1 being a guard symbol enabling a New Radio sidelink receiving user equipment to transition from transmitting to receiving;
transmit an additional first automatic gain control symbol during the symbol 2 of the slot, the additional first automatic gain control symbol being a replica of the first automatic gain control symbol enabling the receiving sidelink user equipment to set an automatic gain control gain for reception of the physical sidelink shared channel and the physical sidelink control channel transmitted in the symbols between the symbol 2 through the symbol 9 of the slot;
switch, during symbol 10 of the slot, from transmitting to receiving;
receive, during symbol 11 of the slot, an additional second automatic gain control symbol transmitted by the receiving sidelink user equipment for automatic gain control setting for reception of a physical sidelink feedback channel; and
receive, during symbol 12 of the slot, hybrid automatic repeat request feedback transmitted on the physical sidelink feedback channel from the receiving sidelink user equipment.

2. The apparatus according to claim 1, wherein the transmission of the first automatic gain control symbol is frequency multiplexed with the transmission of the second automatic gain control symbol.

3. A method performed by an apparatus, the method comprising:
determining a common automatic gain control symbol to be transmitted during a first symbol of a slot, wherein the first symbol of the slot is for a transmission of a first automatic gain control symbol by a transmitting sidelink user equipment and for a transmission of a second automatic gain control symbol by a receiving sidelink user equipment and the apparatus is the transmitting sidelink user equipment, wherein the common automatic gain control symbol comprises the first automatic gain control symbol and the second automatic gain control symbol;
transmitting the first automatic gain control symbol during the first symbol of the slot, wherein:
the first symbol is symbol 0 of a fourteen-symbol New Radio sidelink slot in Frequency Range 1 having a 30 kHz subcarrier spacing;
determining the common automatic gain control symbol comprises determining that the symbol 0 of the slot temporally overlaps, on a same 5.9 GHz carrier frequency, a first symbol of a Long Term Evolution vehicle-to-everything sidelink subframe that is an automatic gain control symbol of a Long Term Evolution sidelink receiving user equipment; and
transmitting the first automatic gain control symbol during the symbol 0 comprises transmitting the first automatic gain control symbol with a highest transmit power that the transmitting sidelink user equipment uses for physical sidelink shared channel and physical sidelink control channel transmissions in symbols between symbol 2 through symbol 9 of the slot;

refraining from transmitting during symbol 1 of the slot, the symbol 1 being a guard symbol enabling a New Radio sidelink receiving user equipment to transition from transmitting to receiving;

transmitting an additional first automatic gain control symbol during the symbol 2 of the slot, the additional first automatic gain control symbol being a replica of the first automatic gain control symbol enabling the receiving sidelink user equipment to set an automatic gain control gain for reception of the physical sidelink shared channel and the physical sidelink control channel transmitted in the symbols between the symbol 2 through the symbol 9 of the slot;

switching, during symbol 10 of the slot, from transmitting to receiving;

receiving, during symbol 11 of the slot, an additional second automatic gain control symbol transmitted by the receiving sidelink user equipment for automatic gain control setting for reception of a physical sidelink feedback channel; and receiving, during symbol 12 of the slot, hybrid automatic repeat request feedback transmitted on the physical sidelink feedback channel from the receiving sidelink user equipment.

4. The method according to claim 3, wherein transmitting the first automatic gain control symbol during the symbol 0 comprises transmitting the first automatic gain control symbol across all physical resource blocks allocated for the physical sidelink shared channel and the physical sidelink control channel in the slot.

5. The method according to claim 4, wherein the additional first automatic gain control symbol transmitted during the symbol 2 is identical in sequence and transmit power to the first automatic gain control symbol transmitted during the symbol 0.

6. The method according to claim 5, wherein the symbols between the symbol 2 through the 9 of the slot comprise transmission of the physical sidelink shared channel and associated demodulation reference signals and the physical sidelink control channel using the same transmit power as used for the first automatic gain control symbol transmitted during the symbol 0.

7. The method according to claim 6, wherein the symbol 11 comprises the additional second automatic gain control symbol transmitted by the receiving sidelink user equipment with a highest transmit power that the receiving sidelink user equipment uses for transmission of the physical sidelink feedback channel in the symbol 12.

8. The method according to claim 7, wherein the first automatic gain control symbol transmitted during the symbol 0 and the second automatic gain control symbol transmitted by the receiving sidelink user equipment during the symbol 0 are frequency multiplexed within the slot using disjoint sets of physical resource blocks.

9. The method according to claim 8, wherein physical resource blocks used for the first automatic gain control symbol are contiguous and adjacent in frequency to physical resource blocks used for the second automatic gain control symbol within the symbol 0.

10. The method according to claim 9, wherein the first automatic gain control symbol comprises a reference sequence selected from a Zadoff-Chu sequence or a Gold sequence, the reference sequence being determined based on a radio network temporary identifier of the transmitting sidelink user equipment.

11. The method according to claim 10, wherein the slot is used for transmission of the physical sidelink feedback channel only in every fourth slot, such that symbols between the symbol 10 through the symbol 12 are present only in slots configured for physical sidelink feedback channel transmission.

12. The method according to claim 11, wherein the fourteen-symbol slot is aggregated with N−1 additional fourteen-symbol slots, and the switching from transmitting to receiving occurs at a symbol corresponding to (N×14−4) and reception of an additional second automatic gain control symbol occurs at a symbol corresponding to (N×14−3).

* * * * *